(12) United States Patent
Mellot (10) Patent No.: US 8,179,967 B2
(45) Date of Patent: *May 15, 2012

(54) METHOD AND DEVICE FOR DETECTING MOVEMENT OF AN ENTITY PROVIDED WITH AN IMAGE SENSOR

(75) Inventor: Pascal Mellot, Lans en Vercors (FR)

(73) Assignee: STMicroelectronics S.A., Montrouge (FR)

( * ) Notice: Subject to any disclaimer, the term of this patent is extended or adjusted under 35 U.S.C. 154(b) by 1720 days.

This patent is subject to a terminal disclaimer.

(21) Appl. No.: 11/480,262

(22) Filed: Jun. 30, 2006

(65) Prior Publication Data

US 2007/0019733 A1 Jan. 25, 2007

(30) Foreign Application Priority Data

Jul. 5, 2005 (FR) ...................................... 05 07167

(51) Int. Cl.
*H04N 11/02* (2006.01)
*H04N 11/04* (2006.01)

(52) U.S. Cl. ............................... 375/240.16; 375/240.24

(58) Field of Classification Search .................. 348/699, 348/404.1, 405.1, 402, 407, 408, 409, 412, 348/413, 415, 416, 430, 431; 382/107, 241, 382/240, 253, 232, 236; 375/240, 240.16, 375/240.12, 240.13, 240.24, 240.01
See application file for complete search history.

(56) References Cited

U.S. PATENT DOCUMENTS

| | | | |
|---|---|---|---|
| 4,371,895 A | 2/1983 | Koga | |
| 5,173,772 A | 12/1992 | Choi | |
| 5,317,397 A * | 5/1994 | Odaka et al. ............. | 375/240.15 |
| 5,644,139 A | 7/1997 | Allen et al. | |
| 6,256,016 B1 | 7/2001 | Piot et al. | |
| 6,708,142 B1 * | 3/2004 | Baillot et al. .................. | 703/2 |
| 7,057,148 B2 * | 6/2006 | Wang ........................... | 250/208.1 |
| 2004/0100444 A1 | 5/2004 | Park et al. | |

(Continued)

FOREIGN PATENT DOCUMENTS

EP 1283493 A2 2/2003

(Continued)

OTHER PUBLICATIONS

Jianhua Lu, A Simple and Efficient Search Algorithm for Block-Matching Estimation, 1997, IEEE, 429-433.*

(Continued)

*Primary Examiner* — Behrooz Senfi
(74) *Attorney, Agent, or Firm* — Seed IP Law Group PLLC (57) ABSTRACT

An image sequence sensor senses images. To associate a motion vector with an image of the sequence currently being processed, k candidate vectors are generated by adding, to a reference motion vector, respectively k search vectors. Then, a motion vector is selected from among the k candidate vectors as a function of a selection rule. Thereafter, the previous two steps are repeated m times, the reference motion vector being on the one hand, for a first iteration of the first step, an initial reference vector selected from among a set of vectors comprising at least one motion vector associated with a previous processed image and being on the other hand, for the m repetitions of the first step, the motion vector selected in the second step preceding the first step. Then, the vector obtained in the third step is associated with the image currently being processed.

27 Claims, 3 Drawing Sheets

U.S. PATENT DOCUMENTS

| | | | |
|---|---|---|---|
| 2004/0114688 A1* | 6/2004 | Kang | 375/240.12 |
| 2005/0053137 A1* | 3/2005 | Holcomb | 375/240.16 |
| 2006/0018552 A1* | 1/2006 | Malayath et al. | 382/232 |
| 2006/0062305 A1* | 3/2006 | Lu et al. | 375/240.16 |
| 2006/0222075 A1* | 10/2006 | Zhang et al. | 375/240.16 |
| 2006/0293558 A1* | 12/2006 | De Groen et al. | 600/101 |
| 2007/0040805 A1 | 2/2007 | Mellot | |
| 2007/0154103 A1* | 7/2007 | Au et al. | 382/236 |
| 2007/0160144 A1* | 7/2007 | Lu et al. | 375/240.16 |

FOREIGN PATENT DOCUMENTS

| | | |
|---|---|---|
| EP | 1361541 A1 | 11/2003 |

OTHER PUBLICATIONS

Liu et al., "Complexity Comparison of Fast Block-Matching Motion Estimation Algorithms," IEEE, ICASSP 2004, Sep. 2004, pp. 341-344.

Rovati et al., "Spatial-Temporal Motion Estimation for Image Reconstruction and Mouse Functionality with Optical or Capacitive Sensors," IEEE Transactions on Consumer Electronics, 49(3):711-718, Aug. 2003.

Lu et al., "A Simple and Efficient Search Algorithm for Block-Matching Motion Estimation," IEEE Transactions on Circuits and Systems for Video Technology, 7(2):429-433, Apr. 1997.

* cited by examiner

METHOD AND DEVICE FOR DETECTING MOVEMENT OF AN ENTITY PROVIDED WITH AN IMAGE SENSOR

BACKGROUND OF THE INVENTION

1. Field of the Invention

The present disclosure pertains to motion estimation methods suitable for processing a sequence of images provided, directly or indirectly, by a moving-image sensor, so as for example to detect the motion of an entity provided with this image sensor.

An embodiment of the present invention is especially suitable for an optical mouse linked to a computer in IT systems.

2. Description of the Related Art

Such image processing is aimed at detecting motions of the mouse so as to retranscribe them into the form of a cursor motion on a computer screen. The motion of the optical mouse is generally detected on the basis of information sensed by a video sensor or some other type of sensor which is fixed on the optical mouse.

Such sensors provide a digital signal in the form of a sequence of images sensed during the movement of the mouse. This digital signal is then processed so as to deduce therefrom the motion of the mouse.

Generally, the mouse is moved over a suitable surface and the video sensor fixed on the mouse captures images of this surface during its movement. The movement of the mouse may then be reconstructed on the basis of the relative positions of objects in the successive captured images. Thus, on the basis of this movement is deduced the movement which may be given to the cursor representing the motion of the mouse on the screen of the computer.

Certain image processing of this type turns out to be complex. It may in fact require powerful calculations which may be expensive in terms of time and/or calculation capacity, and energy consumption, also raising problems of heat dissipation.

In order to render the display of the cursor of the optical mouse more easily achievable, it is advantageous to apply a method of motion estimation.

Such a method facilitates estimating the motion of a block of pixels between two images which follow one another.

Certain methods of this type are used in another technical field, namely video stream compression. A procedure described in the document 'Complexity Comparison of fast block-matching estimation algorithms' by Yilong Liu and Soontorn Oraintara is in particular known.

In the field of the detection of movement of an entity, these methods are based on an association of a motion vector with each of the images processed. Such a vector has a vertical component and a horizontal component. It represents the motion of the mouse from one image to the next.

Thus, in such a context, the motion of all the pixels of each image to be processed may be represented by a single motion vector.

This type of device is often subject to specific technical constraints, such as in particular a time constraint. Specifically, the processing of such images often must be performed in a very short time so that the motion of the mouse can be retranscribed onto the screen of the computer in a manner which is almost instantaneous for the user. Another frequent significant constraint of this type of device is the cost of production.

Figure 1A:
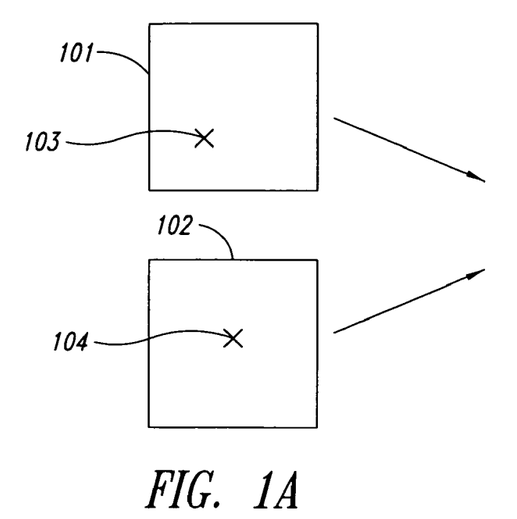
FIGS. 1A and 1B which have already been commented on illustrate a motion vector in an application for detecting movement of an optical mouse.
Figure 1B:
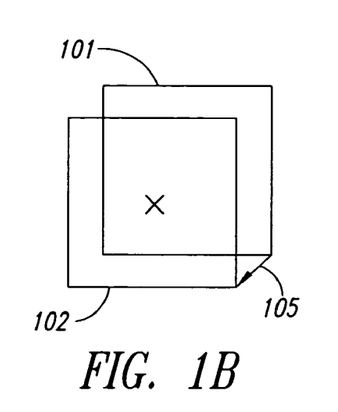

FIGS. 1-A and 1-B illustrate a definition of a motion vector. In FIG. 1-A, a sequence of two images is represented, a first image 101 is followed by a second image 102. The detection of movement of the mouse is based on the relative position of markers included in the various images sensed. The image 101 comprises a marker in position 103 and the image 102 comprises the same marker in position 104. Thus, the movement of the optical mouse may be deduced from its position with respect to this marker.

In FIG. 1-B, the images 101 and 102 are superimposed in such a way that the respective positions of the marker coincide. The motion vector corresponding to the movement of the mouse in this context is represented by the arrow 105. Its components along the horizontal and along the vertical are dubbed X and Y. Thus, the motion of the mouse between the image 101 and the image 102 may be represented subsequently by the motion vector 105. The motion vector 105 which makes it possible to retrieve the position of the mouse in the next image 102 may thus be associated with the image 101.

Estimation of the associated motion of the mouse in a current image, that is to say one which is currently being processed, is generally based on motion vectors previously associated with previous processed images in the sequence of images sensed by the mouse. Then, on the basis of such motion vectors, candidate vectors are generated, that is to say vectors which are apt to represent the motion of the mouse between two successive processed images. Next, relative to these candidate vectors, correlation calculations relating to the position of the mouse are performed, examples of which are well known to the person skilled in the art. The candidate vector for which the largest correlation is calculated is then selected. This vector is then associated with the current image.

The term "processed image" refers to images with which a motion vector has been associated.

It should be noted that, in this type of method, if it turns out that the candidate vectors are not relevant, and nevertheless that which exhibits the best correlation is associated with the current image, such a system may diverge. Thus, a divergence often occurs in the event of abrupt motion of the mouse.

Consequently, the performance of devices applying a motion estimation method is greatly dependent on the quality of the candidate vectors. It is therefore desirable to employ a procedure for generating candidate vectors and for selecting a motion vector to be associated with an image, which is effective and accurate.

BRIEF SUMMARY OF THE INVENTION

An embodiment of the present invention aims to satisfy these requirements.

A first aspect of the disclosure thus proposes a method for detecting movement of an entity provided with an image sequence sensor, the method comprising, in order to associate a motion vector with an image of the sequence currently being processed, the steps consisting in:

/a/ generating k candidate vectors by adding, to a reference motion vector, respectively k search vectors;

/b/ selecting a motion vector from among the said k candidate vectors as a function of a selection rule;

/c/ repeating the previous two steps m times, the said reference motion vector being on the one hand, for a first iteration of step /a/, an initial reference vector selected from among a set of vectors comprising at least one motion vector associated with a previous processed image and being on the other hand, for the m repetitions of step /a/, the motion vector selected in the step /b/ preceding the said step /a/;

/d/ associating the vector obtained in step /c/ with the image currently being processed;

m being an integer greater than or equal to 1 and k being an integer greater than 1;

wherein an amplitude of the search vectors corresponding to the first generating of k candidate vectors is determined by selecting the largest value from among a threshold value, a horizontal component divided by two and a vertical component divided by two of the motion vector associated with the previous processed image.

In an embodiment, a direction of a first and of a second search vector is horizontal, and a direction of a third and of a fourth search vector is vertical; the first and second search vectors on the one hand, and the third and fourth search vectors on the other hand, being of opposite respective senses.

An amplitude of the search vectors corresponding to the first iteration of step /a/ may be determined by selecting the largest value from among a threshold value, a horizontal component divided by two and a vertical component divided by two of the motion vector associated with the previous processed image.

In an embodiment of the present invention, an amplitude of the search vectors corresponding to a repetition of step /a/ is determined by selecting the largest value from among a threshold value, a horizontal component divided by two and a vertical component divided by two of the search vector corresponding to the motion vector selected in the step /b/ preceding the said step /a/.

The selection rule applied to step /b/ may be based on a calculation for correlating a first block of pixels in the image currently being processed and a second block of pixels in the previous processed image, on the basis of which the candidate vector points at the first block of pixels, the candidate vector allowing the largest correlation being selected.

More precisely, the correlation calculation may comprise a calculation of the sum of the absolute values of the differences, for all or some of the pixels of the first block, between the value of a pixel of the first block of pixels and the value of the pixel of the second block of pixels, pointed at by the candidate vector from the said pixel of the first block of pixels.

In an embodiment of the present invention, the set of motion vectors from among which the reference motion vector is selected for the first iteration of step /a/ furthermore comprises the zero vector.

Thus, it is possible to select an initial reference vector which facilitates efficacious application of the method according to an embodiment.

In one embodiment, m is equal to 2 and k is equal to 4. This is an embodiment allowing an advantageous compromise between calculation cost and performance.

A second aspect of an embodiment of the present invention proposes a device for detecting movement of an entity provided with a mobile sensor comprising means suitable for implementing the method according to the first aspect hereinabove.

A third aspect of an embodiment of the invention proposes an optical mouse comprising a mobile image sensor suitable for cooperating with a device for estimating motion according to the second aspect hereinabove.

Another aspect of an embodiment of the invention proposes a "computer program" product loadable directly into the internal memory of a digital computer, comprising portions of software code for the execution of the steps of the motion estimation method according to an embodiment of the present invention.

In one embodiment, a method for detecting movement of an entity provided with an image sequence sensor in order to associate a motion vector with an image of a sequence currently being processed comprises the steps of:

generating k candidate vectors by adding, to a reference motion vector, respectively k search vectors;

selecting a motion vector from among the said k candidate vectors as a function of a selection rule;

repeating the previous two steps m times, the said reference motion vector being for a first iteration of the generating k candidate vectors, an initial reference vector selected from among a set of vectors comprising at least one motion vector associated with a previous processed image and being for the repetitions of the generating k candidate vectors, the motion vector selected in the previous iteration;

associating the vector obtained in a last iteration with the image currently being processed, m being an integer greater than or equal to 1 and k being an integer greater than 1.

In one embodiment, a direction of a first and of a second search vector is horizontal, and a direction of a third and of a fourth search vector is vertical; the first and second search vectors being of a first sense, and the third and fourth search vectors being of an opposite respective sense. In one embodiment, an amplitude of the search vectors corresponding to the first generating of k candidate vectors is determined by selecting the largest value from among a threshold value, a horizontal component divided by two and a vertical component divided by two of the motion vector associated with the previous processed image. In one embodiment, an amplitude of the search vectors corresponding to a repetition of generating k candidate vectors is determined by selecting a largest value from among a threshold value, a horizontal component divided by two and a vertical component divided by two of the search vector corresponding to the motion vector selected in the preceding iteration. In one embodiment, the selection rule is based on a calculation for correlating a first block of pixels in the image currently being processed and a second block of pixels in the previous processed image, the candidate vectors pointing at the first block of pixels, the candidate vector allowing the largest correlation being selected. In one embodiment, one of the k candidate vectors in the first iteration comprises a zero vector. In one embodiment, m is equal to 2 and k is equal to 4.

In one embodiment, a system for processing image sequences comprises an interface configured to receive a plurality of images in an image sequence, a candidate vector generator configured to generate a sequence of sets of a plurality of candidate vectors associated with an image in the plurality of images, and a motion vector selector configured to sequentially select a motion vector from the sets of candidate vectors according to a selection criteria, wherein the candidate vector generator is further configured to generate a subsequent set of candidate vectors based on a previously selected motion vector in the sequence of selected motion vectors. In one embodiment, the system further comprises an image sensor communicatively coupled to the interface and configured to output the plurality of images in the image sequence. In one embodiment, the image sensor comprises a mobile image sensor. In one embodiment, the sequence of sets of candidate vectors comprises two sets of candidate vectors and each set of candidate vectors comprises four candidate vectors. In one embodiment, the candidate vector generator is configured to generate a set of candidate vectors by adding a plurality of search vectors to a reference vector. In one embodiment, the candidate vector generator is configured to set the reference vector for the subsequent set of candidate vectors equal to the previously selected motion vector. In one embodiment, the plurality of search vectors comprises a zero vector.

In one embodiment, a system for processing image sequences comprises means for receiving a plurality of images in an image sequence, and means for iteratively selecting a motion vector for an image in the image sequence from a sequence of sets of candidate vectors. In one embodiment, the means for iteratively selecting a motion vector comprises a candidate vector generator, and a motion vector selector. In one embodiment, the means for iteratively selecting a motion vector is configured to employ two iterations to select the motion vector for an image and a set of candidate vectors in the sequence of sets of candidate vectors comprises four candidate vectors.

In one embodiment, a computer-readable memory medium contains instructions for causing a controller to process an image sequence by performing a method comprising generating a first plurality of candidate vectors for an image in the image sequence based on an initial reference vector, selecting a first motion vector for the image in the image sequence from the first plurality of candidate vectors based on a selection criteria, generating a second plurality of candidate vectors based on the first motion vector for the image, and selecting a second motion vector for the image in the image sequence from the second set of candidate vectors based on the selection criteria. In one embodiment, the method further comprises generating a first plurality of candidate vectors for a subsequent image in the image sequence based on the second motion vector. In one embodiment, the first plurality of candidate vectors comprises four candidate vectors.

In one embodiment, a method of processing an image sequence, comprises generating a first plurality of candidate vectors for an image in the image sequence based on an initial reference vector, selecting a first motion vector for the image in the image sequence from the first plurality of candidate vectors based on a selection criteria, generating a second plurality of candidate vectors based on the first motion vector for the image, and selecting a second motion vector for the image in the image sequence from the second set of candidate vectors based on the selection criteria. In one embodiment, the method further comprises generating a first plurality of candidate vectors for a subsequent image in the image sequence based on the second motion vector. In one embodiment, the first plurality of candidate vectors comprises four candidate vectors. In one embodiment, generating the first plurality of candidate vectors comprises respectively adding a first plurality of search vectors to the initial reference vector. In one embodiment, the plurality of search vectors comprises a first search vector of a first sense, a second search vector of a second sense, a third search vector of a third sense opposite the first sense, and a fourth search vector of a fourth sense opposite the second sense. In one embodiment, an amplitude of the first plurality of search vectors is determined by selecting the largest value from among a threshold value, a horizontal component divided by two and a vertical component divided by two of the initial reference vector. In one embodiment, generating the second plurality of candidate vectors comprises respectively adding a second plurality of search vectors to the first motion vector. In one embodiment, an amplitude of the second plurality of search vectors is determined by selecting the largest value from among a threshold value, a horizontal component divided by two and a vertical component divided by two of the first motion vector. In one embodiment, the method further comprises generating a third plurality of candidate vectors for the image based on the second motion vector, and selecting a third motion vector for the image in the image sequence from the third set of candidate vectors based on the selection criteria. Other aspects, aims and advantages of embodiments of the invention will become apparent on reading the description of one of its embodiments.

BRIEF DESCRIPTION OF THE SEVERAL VIEWS OF THE DRAWINGS

Embodiments of the invention will also be better understood with the aid of the appended drawings, in which.

DETAILED DESCRIPTION OF THE INVENTION

An embodiment of the present invention is more especially described in its application to the detection of movement of an optical mouse. Of course, after reading the specification, it is easy to deduce therefrom an application to any system in which an image sequence processing is applied to detect motions of a mobile sensor with respect to a fixed marker.

Figure 2:
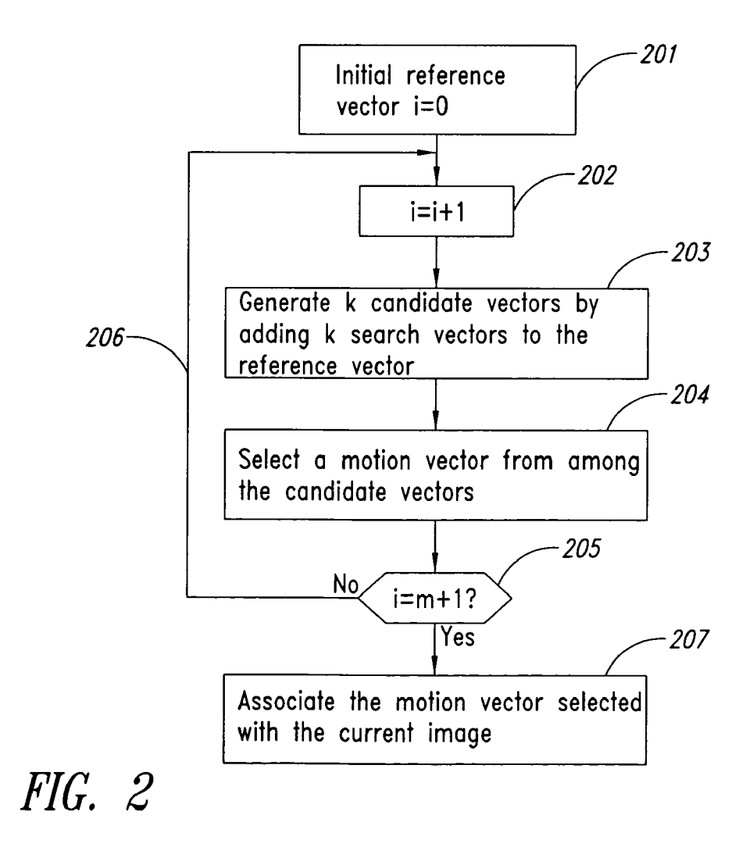
FIG. 2 illustrates the principal steps of a method of detecting movement according to an embodiment of the present invention.

FIG. 2 illustrates the principal steps of a method of detecting movement according to an embodiment of the present invention.

These steps may be applied in relation to each image sensed by the sensor of images bound to the mouse. Of course, in certain circumstances, it may be advantageous to process only some of the images sensed with the aid of these steps.

Thus, for an image currently being processed, an initial reference motion vector is first selected from among a set of motion vectors. In an embodiment of the invention, this set comprises the vector of zero components as well as the motion vector associated with the image previously processed in the sequence of images sensed. Then, the initial reference vector is selected according to a rule which will be detailed later.

In step 201, the method is initialized with an initial reference vector and an index i is initialized to 0.

Then, in step 202, the index i is incremented by a unit.

Next, in step 203, k candidate vectors are generated, k being an integer greater than 1. These candidate vectors are generated by adding respectively k search vectors to the initial reference vector. In one embodiment, k equals four, and two of these vectors may be directed horizontally and of opposite respective senses, while the other two are directed vertically and of respectively opposite senses. These k search vectors may therefore advantageously be 4 in number. However there may be fewer or more along directions other than the vertical and the horizontal.

In step 204, a motion vector is selected from among the candidate vectors thus generated. Such a selection may be performed on the basis of various criteria which will be described hereinbelow.

Steps 202, 203 and 204 are performed m+1 times, m being an integer greater than or equal to 1. For this purpose, in step 205, the value of the index i is compared with the value m+1. In the case where i is less than m+1, steps 202 to 205 are performed again.

In this case, at each repetition of step 203, the reference motion vector is the motion vector selected in the step 204 which has just been performed.

After m repetitions of steps 202 to 204, step 207 is then performed. In this step, the motion vector selected in the previous step 204 is associated with the image currently being processed.

The method is simple and fast to implement and facilitates selecting a reliable motion vector for the images of the sequence of images sensed by a mouse.

Figure 5:
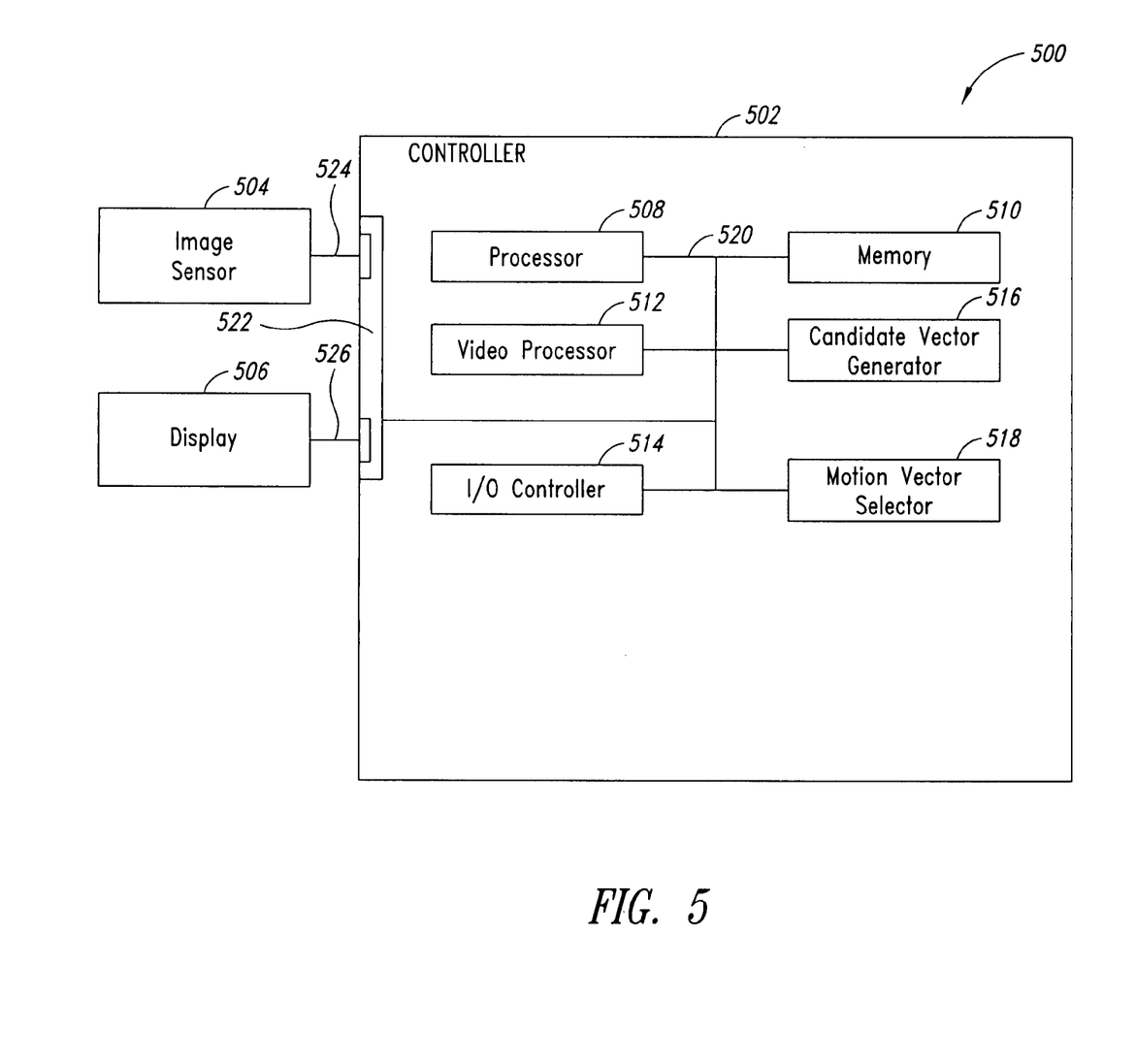
FIG. 5 is a functional block diagram of a system according to an embodiment of the present invention.

All or some of these associated motion vectors may be stored in a memory (See FIG. 5). They may thus be read, asynchronously, by a display function which bases itself on these vectors to move a symbol (for example a cursor) over a computer screen whose motion then follows the motion of the optical mouse.

Figure 3:
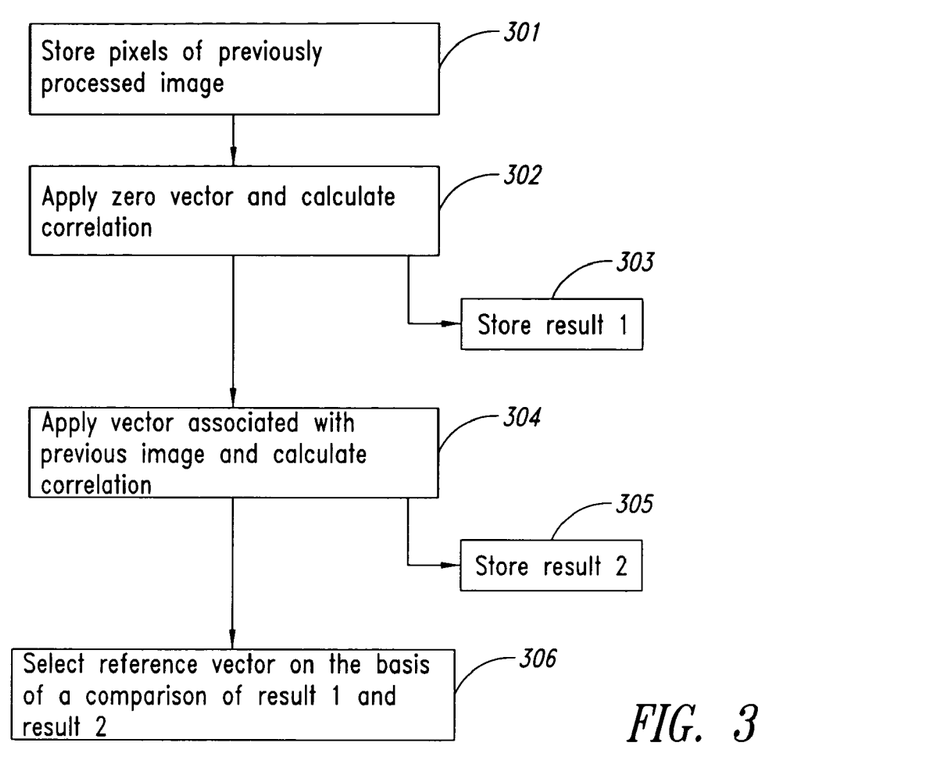
FIG. 3 illustrates a step consisting of obtaining an initial reference vector in a method according to an embodiment of the present invention.

FIG. 3 illustrates a step making it possible to obtain an initial reference vector in a method according to an embodiment.

Subsequently, the successive images of the sequence of images sensed are indexed. With reference to FIG. 3, the image currently being processed is the image indexed n, the image previously processed being the image indexed n−1. It is noted that the previous image processed may not be the previous image in the sequence of images sensed. Specifically, under certain conditions, it may be advantageous not to process all the sensed images of the image sequence.

The images sensed each comprise a number N of pixels, this number possibly being equal in particular to 400, for example for an image of dimension 20 pixels by 20 pixels.

In such an embodiment, the motion vector set from which an initial reference motion vector is selected comprises the zero vector and the motion vector associated with the previous image processed. It should be noted here that it is possible to adapt such a method to a set of vectors comprising a larger number of motion vectors.

Additionally, preferably, a block of pixels is defined within the N pixels representing the image n−1, and the following steps are applied to the pixels of this block of pixels. It is, for example, possible to consider a block of pixels of 14 pixels by 14 pixels.

Thus, in step 301, the N pixels of the previously processed image n−1, and the motion vector associated with this image are stored in memory.

In step 302, the zero vector is applied to the pixel block defined in image n−1 and a calculation of correlation between the value of the pixels of the block of pixels of image n−1 and the value of the pixels of the corresponding block of pixels pointed at in image n is performed. For this purpose, it is possible for example, for each of the pixels of the window, to calculate the difference between the value of this pixel and the value of the pixel pointed at by the zero vector in the image n. The sum of the absolute values of the differences thus obtained is then computed and a first correlation result is obtained.

In step 303, the result of this correlation is then weighted by a value, which is preferably a configuration value, before being stored in memory. Such a weighting is of course optional and is aimed at improving the accuracy of such a method. A weighting value may advantageously be determined as a function of the speed of the images in the sequence of images sensed.

Then, in step 304, the motion vector already associated with image n−1 is applied to the pixel block considered in this image. A correlation calculation is then performed. For this purpose, preferably, for each of the pixels of the pixel block considered in image n−1, we calculate the difference between the value of a pixel of image n−1 and the value of the corresponding pixel in image n, that is to say that pixel of image n which is pointed at from the pixel given by the motion vector associated with image n−1.

The sum of the absolute values of the differences is computed and a second correlation result is therefore obtained, which is stored in memory, in step 305.

It is noted that steps 302 and 304 may be performed in any order.

In step 306, the first and the second correlation results are compared, and on the basis of this comparison, the vector which makes it possible to obtain the largest correlation is selected from the zero vector and the motion vector associated with image n−1.

Figure 4:
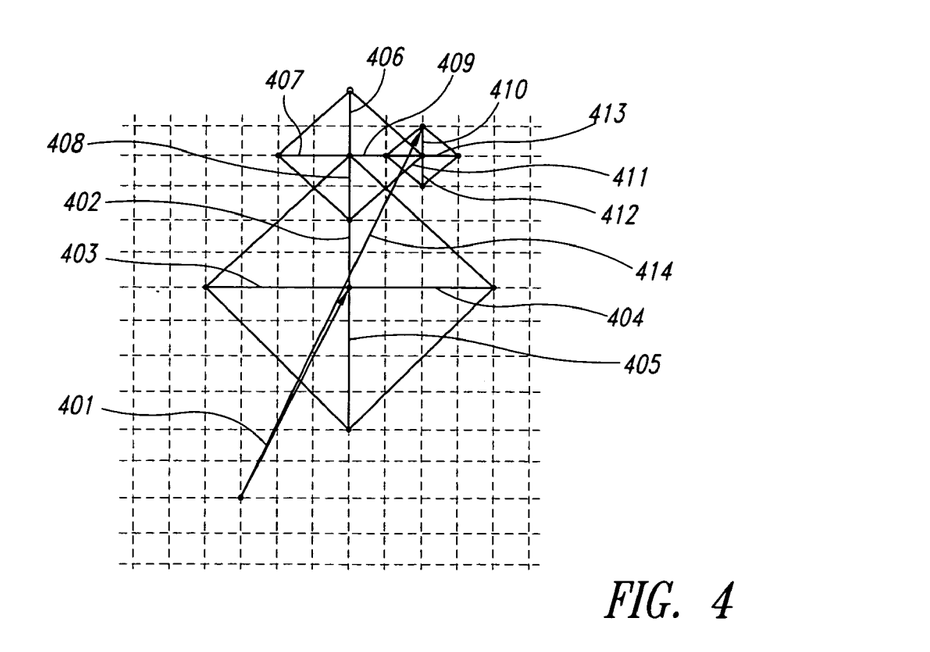
FIG. 4 illustrates, with the aid of the vectors represented, various steps of a method according to an embodiment of the present invention.

FIG. 4 represents in vector form various steps of a method according to an embodiment of the present invention. This vector representation is effected on a grid of squares each of which has sides of a length corresponding to a fraction of a pixel. Such a length may for example be equal to 1/32nd of the length of a pixel.

A vector 401 represents the initial reference motion vector, on the basis of which the various steps of the method according to an embodiment as illustrated in FIG. 2 are applied. In an embodiment, the vector 401 is the motion vector associated with image n−1. In the example described, the value m is considered to be equal to 2.

At the first iteration of step 202, the index i is equal to 1.

Next, in step 203, in the example illustrated in FIG. 4, we generate 4 candidate vectors on the basis of the reference motion vector 401, with coordinates $X_{ref}$ and $Y_{ref}$, by adding thereto respectively 4 search vectors. The first candidate vector is obtained by adding to the reference motion vector 401, a first search vector with zero vertical component and horizontal component determined as a function of at least one component of the initial reference motion vector.

It is thus possible, for example, to determine the coordinates, denoted $X_1$ and $Y_1$, of the first search vector according to the following equation:

$$X_1 = \text{Max}[val_{th}; \frac{1}{2}*|X_{ref}|; \frac{1}{2}*|Y_{ref}|)]$$

$$Y_1 = 0$$

where $val^{th}$ is a preferably configurable threshold value which makes it possible to guarantee a certain amplitude of the search vector, regardless of the components of the reference motion vector.

We thus obtain the first search vector 404.

Then, the coordinates of the second search vector may satisfy the following equation:

$$X_2 = -\text{Max}[val_{th}; \frac{1}{2}*|X_1|; \frac{1}{2}*|Y_1|)]$$

$$Y_2 = 0$$

We thus obtain the second search vector 403.

Then, the coordinates of the third search vector may satisfy the following equation:

$$X_3 = 0$$

$$Y_3 = \text{Max}[val_{th}; \frac{1}{2}*|X_2|; \frac{1}{2}*|Y_2|)]$$

We thus obtain the third search vector 402.

Then, the coordinates of the fourth search vector may satisfy the following equation:

$$X_4 = 0$$

$$Y_4 = -\text{Max}[val_{th}; \frac{1}{2}*|X_3|; \frac{1}{2}*|Y_3|)]$$

We thus obtain the fourth search vector 405.

It is noted that the threshold value is preferably taken into account for the determination of the components of the search vectors so as to improve the convergence of such a method. However, in a variant, it is possible to determine the search vectors on the basis of the coordinates of the corresponding reference vector without employing a threshold value.

The following four candidate vectors are therefore obtained on completion of step 203:

$$V_{cand1} = V(X_{ref}, Y_{ref}) + V(X_1, Y_1) \quad (1)$$

$$V_{cand2} = V(X_{ref}, Y_{ref}) + V(X_2, Y_2) \quad (2)$$

$$V_{cand3} = V(X_{ref}, Y_{ref}) + V(X_3, Y_3) \quad (3)$$

$$V_{cand4} = V(X_{ref}, Y_{ref}) + V(X_4, Y_4) \quad (4)$$

We then perform step 204 aimed at selecting a vector from among these candidate vectors.

For this purpose, preferably, a correlation calculation in relation to each of these candidate vectors is carried out.

It is possible to use the calculation of the absolute sums of the differences in relation to each of these candidate vectors, as described previously.

The candidate vector exhibiting the best correlation is then selected. In the example described, the candidate vector $V_{cand3}$ is selected.

Step 202 and step 203 are repeated. In this last step, the reference motion vector considered is advantageously the motion vector which has just been selected in the previous step 204, that is to say the vector $V_{cand3}$.

Then, 4 candidate vectors are again generated on the basis of this new reference motion vector and of four search vectors.

It is for example possible to determine the coordinates of these search vectors in the same way as during the first iteration of this step. We thus obtain the first search vector 409, the second search vector 407, the third search vector 406 and finally the fourth search vector 408.

The candidate vectors obtained in the second iteration of step 203 satisfy equations (1), (2), (3) and (4) respectively, considering the search vectors 409, 407, 406 and 408.

Then, corresponding correlation calculations are performed in the manner described previously for example. Then, the candidate vector exhibiting the largest correlation is selected. In the example illustrated, the motion vector $V_{cand1}$ is thus selected.

Then, steps 202 to 205 are repeated a last time, considering as reference motion vector, the motion vector that was just selected in step 204, $V_{cand1}$. In the same way as indicated previously, the four search vectors 413, 411, 410 and 412, as illustrated in FIG. 4, are obtained.

The four candidate vectors are then generated on the basis of the new reference motion vector and of the corresponding search vectors which may advantageously be determined as described previously. Then, step 204 of selecting motion vectors from among these four candidate vectors is performed for the third time. For this purpose it is possible to use the same procedures as those described previously with reference to the previous iterations of step 204.

The number m being equal to 3, the last motion vector selected, referenced 414, is thus obtained. Next, step 207 in the course of which the last motion vector selected is associated with the image currently being processed is performed.

It is then possible to process image n+1 by selecting the corresponding initial motion vector on the basis of the zero vector and of the motion vector associated with the previous image processed, that is to say image n.

An embodiment of the invention allows more accurate estimation of motion and hence better rendition of the motion of the cursor representing the optical mouse on a screen, in particular in the case of fast motions of the mouse.

FIG. 5 is a functional block diagram of a system 500 in accordance with an embodiment of the invention. The system 500 comprises a controller 502, an image sensor 504 and a display 506. The image sensor 504 and the display 506 are communicatively coupled to the controller 502 via communication links 524, 526. The communication links 524, 526 may comprise, for example, wires, bus systems, wireless communication links, and/or combinations of the above. The controller 502 may comprise, for example, a computer system. The image sensor 504 may comprise, for example, an optical mouse. The display 506 may comprise, for example, an LCD display.

The controller 502 comprises a processor 508, a memory 510, a video processor 512, an I/O controller 514, a candidate vector generator 516, a motion vector selector 518, a bus system 520, and an interface 522 to receive image sequences from the image sensor 504 and to provide video signals to the display 506. The candidate vector generator 516 is configured to generate candidate vectors by adding search vectors to a reference motion vector. The motion vector selector 518 is configured to select a motion vector from the candidate vectors generated by the candidate vector generator 516.

The controller 502 may be implemented in a variety of ways, including as separate subsystems. For example, the controller 502 may be implemented as a microprocessor, a digital signal processor (DSP), an application-specific integrated circuit (ASIC), or the like, or as a series of instructions stored in a memory, such as the memory 510, and executed by a processor, such as the processor 508, or various combinations of the above. Thus, software modifications to existing hardware may allow the implementation of the system 500.

Various subsystems, such as the video processor 512, I/O controller 514, candidate vector generator 516 and/or the motion vector selector 518 of the controller 502, are identified as separate blocks in the functional block diagram of FIG. 5 because they perform specific functions, as described in more detail above. These subsystems may be discrete units. For example, the I/O controller 514 may be implemented with a discrete circuit. The subsystems also may not be discrete units but may be functions of a software routine, which will probably, but not necessarily, be separately callable and hence identifiable elements. For example, the candidate vector generator 516 may be implemented by a software routine stored in the memory 510 and executed by the processor 508. The various subsystems may be combined. For example, in some embodiments all or portions of the candidate vector generator 516 and the motion vector selector 518 may be integrated into the video processor 512.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method, comprising:
   detecting movement of an entity provided with an image sequence sensor, by:
   generating k candidate vectors by adding, to a reference motion vector, respectively k search vectors;
   selecting a motion vector from among the said k candidate vectors as a function of a selection rule;
   repeating the previous two steps m times, the said reference motion vector being for a first iteration of the generating k candidate vectors, an initial reference vector selected from among a set of vectors comprising at least one motion vector associated with a previous processed image and being for the repetitions of the generating k candidate vectors, the motion vector selected in the previous iteration;
   associating the vector obtained in a last iteration with a current image of an image sequence being processed, m being an integer greater than or equal to 1 and k being an integer greater than 1, wherein an amplitude of the search vectors corresponding to the first generating of k candidate vectors is determined by selecting a largest value from among a threshold value, a horizontal component divided by two and a vertical component divided by two of a motion vector associated with a previous processed image, the generating, the selecting and the associating being performed by a configured controller.

2. The method of claim 1 wherein a direction of a first and of a second search vector is horizontal, and a direction of a third and of a fourth search vector is vertical; the first and second search vectors being of a first direction, and the third and fourth search vectors being of an opposite respective direction.

3. The method of claim 1 wherein an amplitude of the search vectors corresponding to a repetition of generating k candidate vectors is determined by selecting a largest value from among a threshold value, a horizontal component divided by two and a vertical component divided by two of the search vector corresponding to the motion vector selected in the preceding iteration.

4. The method of claim 1 wherein the selection rule is based on a calculation for correlating a first block of pixels in the image currently being processed and a second block of pixels in the previous processed image, the candidate vectors pointing at the first block of pixels, the candidate vector allowing the largest correlation being selected.

5. The method of claim 1 wherein one of the k candidate vectors in the first iteration comprises a zero vector.

6. The method of claim 1 wherein m is equal to 2 and k is equal to 4.

7. A system, comprising:
   a candidate vector generator configured to generate a sequence of sets of a plurality of candidate vectors associated with an image in a plurality of images of an image sequence; and
   a motion vector selector configured to sequentially select a motion vector from the sets of candidate vectors according to a selection criteria, wherein the candidate vector generator is further configured to generate a subsequent set of candidate vectors based on a previously selected motion vector in the sequence of selected motion vectors and an amplitude of search vectors corresponding to the first set of candidate vectors is determined by selecting the largest value from among a threshold value, a horizontal component divided by two and a vertical component divided by two of a motion vector associated with a previous processed image.

8. The system of claim 7, further comprising:
   an interface configured to receive the plurality of images in the image sequence;
   an image sensor communicatively coupled to the interface and configured to output the plurality of images in the image sequence.

9. The system of claim 8 wherein the image sensor comprises a mobile image sensor.

10. The system of claim 7 wherein the sequence of sets of candidate vectors comprises two sets of candidate vectors and each set of candidate vectors comprises four candidate vectors.

11. The system of claim 7 wherein the candidate vector generator is configured to generate a set of candidate vectors by adding a plurality of search vectors to a reference vector.

12. The system of claim 11 wherein the candidate vector generator is configured to set the reference vector for the subsequent set of candidate vectors equal to the previously selected motion vector.

13. The system of claim 11 wherein the plurality of search vectors comprises a zero vector.

14. A system for processing image sequences, comprising:
    means for receiving a plurality of images in an image sequence; and
    means for iteratively selecting a motion vector for an image in the image sequence from a sequence of sets of candidate vectors wherein an amplitude of search vectors corresponding to a first set of candidate vectors is determined by selecting a largest value from among a threshold value, a horizontal component divided by two and a vertical component divided by two of a motion vector associated with a previous processed image.

15. The system of claim 14 wherein the means for iteratively selecting a motion vector comprises:
    a candidate vector generator; and
    a motion vector selector.

16. The system of claim 14 wherein the means for iteratively selecting a motion vector is configured to employ two iterations to select the motion vector for an image and a set of candidate vectors in the sequence of sets of candidate vectors comprises four candidate vectors.

17. A non-transitory computer-readable memory medium containing instructions for causing a controller to process an image sequence by performing a method comprising:
    generating a first plurality of candidate vectors for an image in the image sequence based on an initial reference vector;
    selecting a first motion vector for the image in the image sequence from the first plurality of candidate vectors based on a selection criteria;
    generating a second plurality of candidate vectors based on the first motion vector for the image; and
    selecting a second motion vector for the image in the image sequence from the second set of candidate vectors based on the selection criteria, wherein an amplitude of search vectors corresponding to the first plurality of candidate vectors is determined by selecting a largest value from among a threshold value, a horizontal component divided by two and a vertical component divided by two of a motion vector associated with a previous processed image.

18. The non-transitory computer readable memory medium of claim 17 wherein the method further comprises:
    generating a first plurality of candidate vectors for a subsequent image in the image sequence based on the second motion vector.

19. The non-transitory computer readable memory medium of claim 17 wherein the first plurality of candidate vectors comprises four candidate vectors.

20. A method, comprising:
generating a first plurality of candidate vectors for an image in an image sequence based on an initial reference vector;
selecting a first motion vector for the image in the image sequence from the first plurality of candidate vectors based on a selection criteria;
generating a second plurality of candidate vectors based on the first motion vector for the image; and
selecting a second motion vector for the image in the image sequence from the second set of candidate vectors based on the selection criteria, wherein an amplitude of a first plurality of search vectors corresponding to the first plurality of candidate vectors is determined by selecting a largest value from among a threshold value, a horizontal component divided by two and a vertical component divided by two of the initial reference vector, the generating the first plurality of candidate vectors, the selecting a first motion vector, the generating a second plurality of vectors and the selecting a second motion vector being performed by a configured computing device.

21. The method of claim 20, further comprising:
generating a first plurality of candidate vectors for a subsequent image in the image sequence based on the second motion vector.

22. The method of claim 20 wherein the first plurality of candidate vectors comprises four candidate vectors.

23. The method of claim 20 wherein generating the first plurality of candidate vectors comprises respectively adding the first plurality of search vectors to the initial reference vector.

24. The method of claim 23 wherein the first plurality of search vectors comprises a first search vector of a first sense, a second search vector of a second sense, a third search vector of a third sense opposite the first sense, and a fourth search vector of a fourth sense opposite the second sense.

25. The method of claim 23 wherein generating the second plurality of candidate vectors comprises respectively adding a second plurality of search vectors to the first motion vector.

26. The method of claim 25 wherein an amplitude of the second plurality of search vectors is determined by selecting a largest value from among a threshold value, a horizontal component divided by two and a vertical component divided by two of the first motion vector.

27. The method of claim 20, further comprising:
generating a third plurality of candidate vectors for the image based on the second motion vector; and
selecting a third motion vector for the image in the image sequence from the third set of candidate vectors based on the selection criteria.

* * * * *